US009551470B2

(12) United States Patent
Li

(10) Patent No.: US 9,551,470 B2
(45) Date of Patent: Jan. 24, 2017

(54) ELECTRIC CANDLE WITH ILLUMINATING PANEL

(71) Applicant: Xiaofeng Li, Shenzhen (CN)

(72) Inventor: Xiaofeng Li, Shenzhen (CN)

( * ) Notice: Subject to any disclaimer, the term of this patent is extended or adjusted under 35 U.S.C. 154(b) by 61 days.

(21) Appl. No.: 14/449,865

(22) Filed: Aug. 1, 2014

(65) Prior Publication Data

US 2015/0369431 A1 Dec. 24, 2015

(30) Foreign Application Priority Data

Jun. 24, 2014 (CN) ...................... 2014 2 0342430 U

(51) Int. Cl.
*F21V 21/00* (2006.01)
*F21S 6/00* (2006.01)
*F21S 10/04* (2006.01)
*H05B 33/08* (2006.01)
*F21V 23/04* (2006.01)
*F21W 121/00* (2006.01)
*F21S 9/02* (2006.01)
*F21Y 101/00* (2016.01)

(52) U.S. Cl.
CPC ............... *F21S 6/001* (2013.01); *F21K 9/232* (2016.08); *F21S 10/046* (2013.01); *H05B 33/0815* (2013.01); *H05B 33/0842* (2013.01); *F21S 9/02* (2013.01); *F21V 23/04* (2013.01); *F21W 2121/00* (2013.01); *F21Y 2101/00* (2013.01); *F21Y 2105/16* (2016.08); *F21Y 2113/13* (2016.08); *F21Y 2115/10* (2016.08)

(58) Field of Classification Search
CPC ............ F21S 10/046; F21S 6/001; F21S 9/00; F21S 10/00; F21S 10/04; F21V 23/003; F21W 2131/00; F21Y 2101/02; H05B 33/0815; H05B 33/0842
USPC .................................. 362/392, 249.02, 269
See application file for complete search history.

(56) References Cited

U.S. PATENT DOCUMENTS

| 782,156 | A | 2/1905 | Meeker |
|---|---|---|---|
| 817,772 | A | 4/1906 | Helmer |
| 1,507,371 | A | 9/1924 | Goodridge |
| 1,842,167 | A | 1/1932 | Hall |
| 1,955,042 | A | 4/1934 | Work |
| D102,561 | S | 12/1936 | Lamb |

(Continued)

FOREIGN PATENT DOCUMENTS

| CN | 1030823 | 2/1989 |
|---|---|---|
| CN | 2483103 | 3/2002 |

(Continued)

OTHER PUBLICATIONS

U.S. Appl. No. 61/101,611 to Schnuckle, filed Sep. 30, 2008.

(Continued)

*Primary Examiner* — Ali Alavi
(74) *Attorney, Agent, or Firm* — Perkins Coie LLP

(57) ABSTRACT

The present disclosure, in one embodiment, relates to an electric flameless candle, comprising a body configured in shape and size to simulate a true flame candle. The electric flameless candle further comprising a light source operably connected to the body and positioned to be generally protruding from an exterior surface of the body, the light source comprising a plurality of illuminators electrically operated to illuminate in a way that simulates the movement of a real candle's flame.

23 Claims, 12 Drawing Sheets

(56) References Cited

U.S. PATENT DOCUMENTS

| | | |
|---|---|---|
| 2,435,811 A | 2/1948 | Waters |
| 2,932,351 A | 6/1958 | Bried |
| 2,976,450 A | 3/1961 | Benoliel |
| 2,984,032 A | 5/1961 | Cornell |
| 3,233,093 A | 2/1966 | Gerlat |
| 3,384,774 A | 5/1968 | English |
| 3,425,157 A | 2/1969 | Hartsock |
| 3,514,660 A | 5/1970 | Kopelman |
| 3,603,013 A | 9/1971 | Gardiner |
| 3,639,749 A | 2/1972 | Beckman |
| 3,681,588 A | 8/1972 | Lee |
| 3,814,973 A | 6/1974 | Thouret et al. |
| 3,890,085 A | 6/1975 | Andeweg |
| 4,026,544 A | 5/1977 | Plambeck et al. |
| 4,067,111 A | 1/1978 | Truitt |
| 4,328,534 A | 5/1982 | Abe |
| 4,477,249 A | 10/1984 | Ruzek et al. |
| 4,550,363 A | 10/1985 | Sandell |
| 4,551,794 A | 11/1985 | Sandell |
| 4,617,614 A | 10/1986 | Lederer |
| 4,728,871 A | 3/1988 | Andrews |
| 4,777,571 A | 10/1988 | Morgan |
| 4,866,580 A | 9/1989 | Blackerby |
| 4,965,707 A | 10/1990 | Butterfield |
| 5,072,208 A | 12/1991 | Christensen |
| 5,097,180 A | 3/1992 | Ignon et al. |
| 5,152,602 A | 10/1992 | Boschetto |
| 5,381,325 A | 1/1995 | Messana |
| 5,707,282 A | 1/1998 | Clements et al. |
| 5,924,784 A * | 7/1999 | Chliwnyj ............... F21S 9/02 307/64 |
| 6,198,229 B1 | 3/2001 | McCloud et al. |
| 6,241,362 B1 | 6/2001 | Morrison |
| 6,257,755 B1 | 7/2001 | Sevelle |
| 6,302,555 B1 | 10/2001 | Bristow |
| 6,312,137 B1 | 11/2001 | Hsieh |
| 6,454,425 B1 | 9/2002 | Lin |
| 6,461,011 B1 | 10/2002 | Harrison |
| 6,491,516 B1 | 12/2002 | Tal et al. |
| 6,511,219 B2 | 1/2003 | Sevelle |
| D486,924 S | 2/2004 | Skradski et al. |
| 6,688,752 B2 | 2/2004 | Moore |
| 6,712,493 B2 | 3/2004 | Tell et al. |
| 6,757,487 B2 | 6/2004 | Martin et al. |
| 6,781,270 B2 | 8/2004 | Long |
| 6,953,401 B2 | 10/2005 | Starr |
| 6,955,440 B2 | 10/2005 | Niskanen |
| 6,966,665 B2 | 11/2005 | Limburg et al. |
| 7,029,146 B2 | 4/2006 | Kitchen |
| 7,080,472 B2 | 7/2006 | Schroeter et al. |
| 7,083,315 B2 | 8/2006 | Hansler et al. |
| 7,093,949 B2 | 8/2006 | Hart et al. |
| 7,111,421 B2 | 9/2006 | Corry et al. |
| 7,118,243 B2 | 10/2006 | McCavit et al. |
| 7,125,142 B2 | 10/2006 | Wainwright |
| 7,159,994 B2 | 1/2007 | Schnuckle et al. |
| D545,458 S | 6/2007 | Jensen |
| 7,261,455 B2 | 8/2007 | Schnuckle et al. |
| 7,300,179 B1 | 11/2007 | LaDuke et al. |
| 7,305,783 B2 | 12/2007 | Mix et al. |
| D567,993 S | 4/2008 | Shiu |
| 7,360,935 B2 | 4/2008 | Jensen et al. |
| D576,317 S | 9/2008 | Jensen |
| D589,176 S | 3/2009 | Huang et al. |
| D599,491 S | 9/2009 | Luo |
| 7,633,232 B2 | 12/2009 | Wong |
| 7,686,471 B2 | 3/2010 | Reichow |
| 7,824,627 B2 | 11/2010 | Michaels et al. |
| 7,828,462 B2 | 11/2010 | Jensen et al. |
| 7,837,355 B2 | 11/2010 | Schnuckle |
| 8,070,319 B2 | 12/2011 | Schnuckle et al. |
| 8,081,872 B2 | 12/2011 | Wang |
| 8,132,936 B2 | 3/2012 | Patton et al. |
| 8,210,708 B2 | 7/2012 | Hau et al. |
| 8,235,558 B1 | 8/2012 | Lauer |
| 8,454,190 B2 | 6/2013 | Hau et al. |
| 8,534,869 B2 | 9/2013 | Patton et al. |
| 8,696,166 B2 | 4/2014 | Patton et al. |
| 8,789,986 B2 | 7/2014 | Li |
| 8,894,261 B2 | 11/2014 | Chen |
| 8,926,137 B2 | 1/2015 | Li |
| 8,998,461 B2 | 4/2015 | Gutstein et al. |
| 9,033,553 B2 | 5/2015 | Li |
| 9,052,078 B2 | 6/2015 | Sheng |
| 9,335,014 B2 | 5/2016 | Patton et al. |
| 9,360,181 B2 | 6/2016 | Li |
| 9,366,402 B2 | 6/2016 | Li |
| 9,371,972 B2 | 6/2016 | Li |
| 9,371,973 B2 | 6/2016 | Li |
| 9,447,938 B2 | 9/2016 | Li |
| 2001/0033488 A1 | 10/2001 | Chliwnyj et al. |
| 2002/0080601 A1 | 6/2002 | Meltzer |
| 2003/0041491 A1 | 3/2003 | Mix |
| 2003/0053305 A1 | 3/2003 | Lin |
| 2003/0072154 A1* | 4/2003 | Moore ................... F21S 10/04 362/234 |
| 2004/0114351 A1 | 6/2004 | Stokes et al. |
| 2004/0165374 A1 | 8/2004 | Robinson |
| 2004/0223326 A1* | 11/2004 | Wainwright ............ F21S 6/001 362/231 |
| 2005/0007779 A1 | 1/2005 | Nozawa et al. |
| 2005/0097792 A1 | 5/2005 | Naden |
| 2005/0169812 A1 | 8/2005 | Helf et al. |
| 2005/0196716 A1* | 9/2005 | Haab ...................... F21S 6/001 431/126 |
| 2005/0254248 A1 | 11/2005 | Lederer |
| 2005/0285538 A1 | 12/2005 | Jaworski et al. |
| 2006/0034079 A1 | 2/2006 | Schnuckle et al. |
| 2006/0034100 A1 | 2/2006 | Schnuckle et al. |
| 2006/0101681 A1 | 5/2006 | Hess et al. |
| 2006/0120080 A1 | 6/2006 | Sipinski et al. |
| 2006/0146544 A1 | 7/2006 | Leung |
| 2006/0192503 A1 | 8/2006 | Trombetta |
| 2007/0002560 A1 | 1/2007 | Gutstein et al. |
| 2007/0053174 A1 | 3/2007 | Lin |
| 2007/0127249 A1 | 6/2007 | Medley et al. |
| 2007/0154857 A1 | 7/2007 | Cho |
| 2007/0159422 A1 | 7/2007 | Blandino et al. |
| 2007/0236947 A1 | 10/2007 | Jensen et al. |
| 2008/0074875 A1 | 3/2008 | Jensen et al. |
| 2008/0112154 A1 | 5/2008 | Reichow |
| 2008/0129226 A1 | 6/2008 | DeWitt et al. |
| 2008/0130266 A1 | 6/2008 | DeWitt et al. |
| 2008/0151563 A1 | 6/2008 | Chen |
| 2009/0059596 A1 | 3/2009 | Lederer |
| 2009/0135586 A1 | 5/2009 | Yang |
| 2010/0001662 A1 | 1/2010 | Nelkin |
| 2010/0079999 A1 | 4/2010 | Schnuckle |
| 2010/0134022 A1 | 6/2010 | Gutstein et al. |
| 2011/0000666 A1 | 1/2011 | Couto |
| 2011/0019422 A1 | 1/2011 | Schnuckle |
| 2011/0110073 A1 | 5/2011 | Schnuckle et al. |
| 2011/0127914 A1 | 6/2011 | Patton |
| 2011/0195787 A1 | 8/2011 | Wells |
| 2011/0204828 A1 | 8/2011 | Moody et al. |
| 2011/0317403 A1 | 12/2011 | Fournier et al. |
| 2012/0049765 A1 | 3/2012 | Lu |
| 2012/0093491 A1 | 4/2012 | Browder |
| 2012/0134157 A1 | 5/2012 | Li |
| 2012/0313518 A1* | 12/2012 | Sun ..................... F21V 29/2206 315/32 |
| 2013/0050985 A1 | 2/2013 | Kwok et al. |
| 2013/0163249 A1 | 6/2013 | Miura |
| 2013/0223043 A1 | 8/2013 | Ray |
| 2013/0265748 A1 | 10/2013 | Hau et al. |
| 2014/0035483 A1 | 2/2014 | Becker |
| 2014/0211499 A1 | 7/2014 | Fong et al. |
| 2014/0254148 A1 | 9/2014 | Fournier |
| 2014/0268652 A1 | 9/2014 | Li |
| 2014/0268704 A1 | 9/2014 | Yang |
| 2014/0286024 A1 | 9/2014 | Li |
| 2014/0313694 A1 | 10/2014 | Patton et al. |
| 2014/0362592 A1 | 12/2014 | Lee |

(56) References Cited

U.S. PATENT DOCUMENTS

| | | | |
|---|---|---|---|
| 2015/0036348 A1* | 2/2015 | Dong | F21S 10/046 362/293 |
| 2015/0109786 A1 | 4/2015 | Li | |
| 2015/0124442 A1 | 5/2015 | Ding | |
| 2015/0233538 A1 | 8/2015 | Sheng | |
| 2015/0308643 A1 | 10/2015 | Huang | |
| 2015/0369431 A1 | 12/2015 | Li | |
| 2015/0369432 A1 | 12/2015 | Li | |
| 2016/0040844 A1 | 2/2016 | Patton | |
| 2016/0047517 A1 | 2/2016 | Li | |
| 2016/0057829 A1 | 2/2016 | Li | |
| 2016/0109082 A1 | 4/2016 | Li | |
| 2016/0109083 A1 | 4/2016 | Li | |
| 2016/0186947 A1 | 6/2016 | Li | |
| 2016/0258584 A1 | 9/2016 | Li | |

FOREIGN PATENT DOCUMENTS

| | | |
|---|---|---|
| CN | 2551859 | 5/2003 |
| CN | 2562059 Y | 7/2003 |
| CN | 1530141 A | 9/2004 |
| CN | 1646177 A | 7/2005 |
| CN | 2854329 Y | 1/2007 |
| CN | 2888274 Y | 4/2007 |
| CN | 200940808 Y | 8/2007 |
| CN | 201011621 Y | 1/2008 |
| CN | 201059432 Y | 5/2008 |
| CN | 201103952 Y | 8/2008 |
| CN | 201159425 Y | 12/2008 |
| CN | 101408284 A | 4/2009 |
| CN | 201235095 Y | 5/2009 |
| CN | 201418887 Y | 3/2010 |
| CN | 201533921 U | 7/2010 |
| CN | 101865413 A | 10/2010 |
| CN | 201643048 U | 11/2010 |
| CN | 102147095 A | 8/2011 |
| CN | 102748589 A | 10/2012 |
| CN | 203131550 | 8/2013 |
| CN | 203273670 U | 11/2013 |
| CN | 203442498 U | 2/2014 |
| CN | 203517611 U | 4/2014 |
| CN | 203571618 U | 4/2014 |
| CN | 104048246 | 9/2014 |
| CN | 104089241 | 10/2014 |
| CN | 203940346 | 11/2014 |
| DE | 1489617 A1 | 5/1969 |
| DE | 102012206988 A1 | 10/2013 |
| EP | 0138786 A1 | 4/1985 |
| EP | 0855189 A2 | 7/1998 |
| EP | 1838110 A1 | 9/2007 |
| EP | 2587127 A1 | 5/2013 |
| GB | 2230335 | 10/1990 |
| GB | 2323159 A | 9/1998 |
| GB | 2379731 A | 3/2003 |
| GB | 2385413 A | 8/2003 |
| GB | 2455598 A | 6/2009 |
| JP | H0652709 | 2/1994 |
| JP | H1057464 A | 3/1998 |
| JP | 2000284730 A | 10/2000 |
| JP | 2008180755 A | 8/2008 |
| WO | WO-8202756 A1 | 8/1982 |
| WO | WO-8503561 A1 | 8/1985 |
| WO | WO-8704506 A1 | 7/1987 |
| WO | WO-9625624 A1 | 8/1996 |
| WO | WO-0192780 | 12/2001 |
| WO | WO-03011349 | 2/2003 |
| WO | WO-2006020839 A2 | 2/2006 |
| WO | WO-2008092753 A2 | 8/2008 |
| WO | WO2010009575 | 1/2010 |
| WO | WO-2012000418 A1 | 1/2012 |
| WO | WO-2013020263 A2 | 2/2013 |

OTHER PUBLICATIONS

U.S. Appl. No. 61/293,516 to Patton, filed Jan. 8, 2010.

International Search Report and Written Opinion for PCT Application No. PCT/CN/2014/073557 mailed Jul. 2, 2014.

International Search Report for PCT Application No. PCT/US2009/054401 mailed Oct. 26, 2009.

EP Search Report for European Patent Application No. 12185984.7 mailed Dec. 14, 2012.

Engineer's Handbook (Epoxy definition), http://engineershandbook.com/Materials/epoxy.htm, Jul. 18, 2013.

Nagashima, H. et al., "Introduction to Chaos, Physics and Mathematics of Chaotic Phenomena," Institute of Physics Publishing, 1999.

Definition of "Electromagnet" in the Encarta World English Dictionary, Aug. 1999.

Lab M3: The Physical Pendulum, Physics 1140—Experimental Physics, Course Laboratory Instructions, 2000.

U.S. Appl. No. 15/150,057, filed May 9, 2016, Li.

U.S. Appl. No. 15/197,354, filed Jun. 29, 2016, Li.

Notice of Allowance for U.S. Appl. No. 13/325,754 mailed Jun. 18, 2014, 10 pages.

Non-Final Office Action for U.S. Appl. No. 13/325,754 mailed Dec. 30, 2013, 14 pages.

Notice of Allowance for U.S. Appl. No. 14/161,143 mailed Nov. 13, 2014, 18 pages.

Final Office Action for U.S. Appl. No. 14/161,143 mailed Oct. 20, 2014, 15 pages.

Non-Final Office Action for U.S. Appl. No. 14/161,143 mailed Apr. 30, 2014, 18 pages.

Non-Final Office Action for U.S. Appl. No. 14/558,507 mailed Sep. 2, 2015, 21 pages.

Notice of Allowance for U.S. Appl. No. 14/588,507 mailed Dec. 4, 2015, 11 pages.

Non-Final Office Action for U.S. Appl. No. 14/558,507 mailed Mar. 17, 2016, 18 pages.

Notice of Allowance for U.S. Appl. No. 14/588,507 mailed May 3, 2016, 7 pages.

Non-Final Office Action for U.S. Appl. No. 14/925,893 mailed Feb. 25, 2016, 37 pages.

Final Office Action for U.S. Appl. No. 14/925,893 mailed Apr. 26, 2016, 29 pages.

Non-Final Office Action for U.S. Appl. No. 14/925,893 mailed May 16, 2016, 13 pages.

Non-Final Office Action for U.S. Appl. No. 14/925,899 mailed Jan. 5, 2016, 21 pages.

Non-Final Office Action for U.S. Appl. No. 14/925,899 mailed Apr. 14, 2016, 25 pages.

Non-Final Office Action for U.S. Appl. No. 14/927,213 mailed Feb. 25, 2016, 33 pages.

Notice of Allowance for U.S. Appl. No. 14/927,213 mailed May 11, 2016, 12 pages.

Non-Final Office Action for U.S. Appl. No. 14/925,899 mailed May 25, 2016, 18 pages.

Supplementary Search Report and Opinion for EP 14764844, Jul. 28, 2016, 12 pages.

Non-Final Office Action for U.S. Appl. No. 15/145,739 mailed Jul. 27, 2016, 22 pages.

Notice of Allowance for U.S. Appl. No. 14/925,893, mailed Jul. 20, 2016, 9 pages.

Notice of Allowance for U.S. Appl. No. 14/925,899, mailed Aug. 3, 2016, 9 pages.

Non-Final Office Action for U.S. Appl. No. 15/061,648 mailed Jul. 12, 2016, 47 pages.

Final Office Action for U.S. Appl. No. 14/928,696 mailed Jul. 14, 2016, 27 pages.

International Search Report for PCT/CN2014/091362 mailed Apr. 3, 2015, 2 pages.

Non-Final Office Action for U.S. Appl. No. 15/187,618 mailed Aug. 18, 2016, 13 pages.

Final Office Action for U.S. Appl. No. 13/908,571 mailed Sep. 30, 2014, 18 pages.

(56) References Cited

OTHER PUBLICATIONS

Final Office Action for U.S. Appl. No. 13/908,571 mailed Mar. 18, 2014, 21 pages.
Non-Final Office Action for U.S. Appl. No. 13/908,571 mailed Sep. 6, 2013, 12 pages.
Notice of Allowance for U.S. Appl. No. 13/526,067 mailed Feb. 6, 2013, 8 pages.
Non-Final Office Action for U.S. Appl. No. 13/526,067 mailed Jun. 18, 2012, 23 pages.
Final Office Action for U.S. Appl. No. 12/273,337 mailed Jan. 18, 2012, 17 pages.
Notice of Allowance for U.S. Appl. No. 12/273,337 mailed Mar. 26, 2012, 8 pages.
Non-Final Office Action for U.S. Appl. No. 12/273,337 mailed Nov. 18, 2008, 17 pages.
Notice of Allowance for U.S. Appl. No. 15/158,508 mailed Sep. 21, 2016, 8 pages.

\* cited by examiner

ELECTRIC CANDLE WITH ILLUMINATING PANEL

CROSS-REFERENCE TO RELATED APPLICATIONS

This application claims the benefit of Chinese Patent Application No. 201420342430, filed on Jun. 24, 2014, entitled "A Simulated Flame Lighting Device," the disclosure of which is hereby incorporated by reference herein in its entirety.

FIELD OF THE INVENTION

The present disclosure relates to novel and advantageous flameless electric candles. Particularly, the present disclosure relates to electric candles simulating a realistic flame of a true flame candle.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditional true flame candles, when lit, provide a pleasant ambience in many homes, hotels, churches, businesses, etc. Traditional candles however, provide a variety of hazards including risk of fire, damage to surfaces caused by hot wax, and the possible emission of soot. Flameless candles have become increasingly popular alternatives to traditional candles. With no open flame or hot melted wax, flameless candles provide a longer-lasting, safe, and clean alternative. There are flameless candles available that use light emitting diodes (LEDs) as a light source. However, such flameless candles do not provide a natural looking and light emitting light source that may simulate the natural flicker and movements of a flame.

Thus, there is a need in the art for a candle that is aesthetically similar to a traditional candle. More particularly, there is a need for a flameless candle that emits a light that simulates the more natural, flame-like flicker and movement of light found in traditional candles.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to an electric flameless candle, comprising a body configured in shape and size to simulate a true flame candle. The electric flameless candle further comprising a light source operably connected to the body and positioned to be generally protruding from an exterior surface of the body, the light source comprising a plurality of illuminators electrically operated to illuminate in a way that simulates the movement of a real candle's flame.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous flameless candles. Particularly, the present disclosure relates to novel and advantageous flameless candles simulating a realistic flame on a LED panel or matrix.

The present disclosure relates to a flameless candle and flameless light that uses a LED light source to provide the appearance of a natural flame and flame-like flicker of light. The flameless candle may include a body having a top surface, a bottom surface upon which the body rests, and a sidewall between the bottom surface and the top surface. The flameless light may include a body having a bulb like cover and a mounting base or end cap, which may, in some embodiments, connect to a traditional light socket. One or more control switches may be used to provide a variety of functions when activated separately or together, including but not limited to, turning the light source ON or OFF, operating the light source in a static or dynamic flame mode, adjusting the size of the flame, changing the color of the light, dimming or brightening of the light source, displaying one or more varying images or light configurations, adjusting the position of a luminous panel, or operating a timer.

The simulated flame may be created by lights positioned on the luminous panel. In at least one embodiment, the luminous panel may raise or lower out of the body of the candle when activated or deactivated. The lights, or illuminators, on the luminous panel may be in electrical communication with a circuit board which may provide one or more signals to the lights. In various embodiments, a signal or signals may control which lights on the luminous panel are turned ON in order to simulate the appearance of a flame, or any other desired image or configuration of lights. In some embodiments, a signal or the signals may be comprised of random frequencies and amplitudes of current. The circuit board may also control pulse-width modulation and the frequency and duty ration of the signal(s) received by the light. The signal(s) transmitted randomly to one or more of the LED lights on the luminous panel may cause the LEDs to produce what appears to be a natural flame which has a natural "flicker" of light to the human eye, in accordance with one embodiment of the present disclosure.

The Flameless Candle

Figure 1:
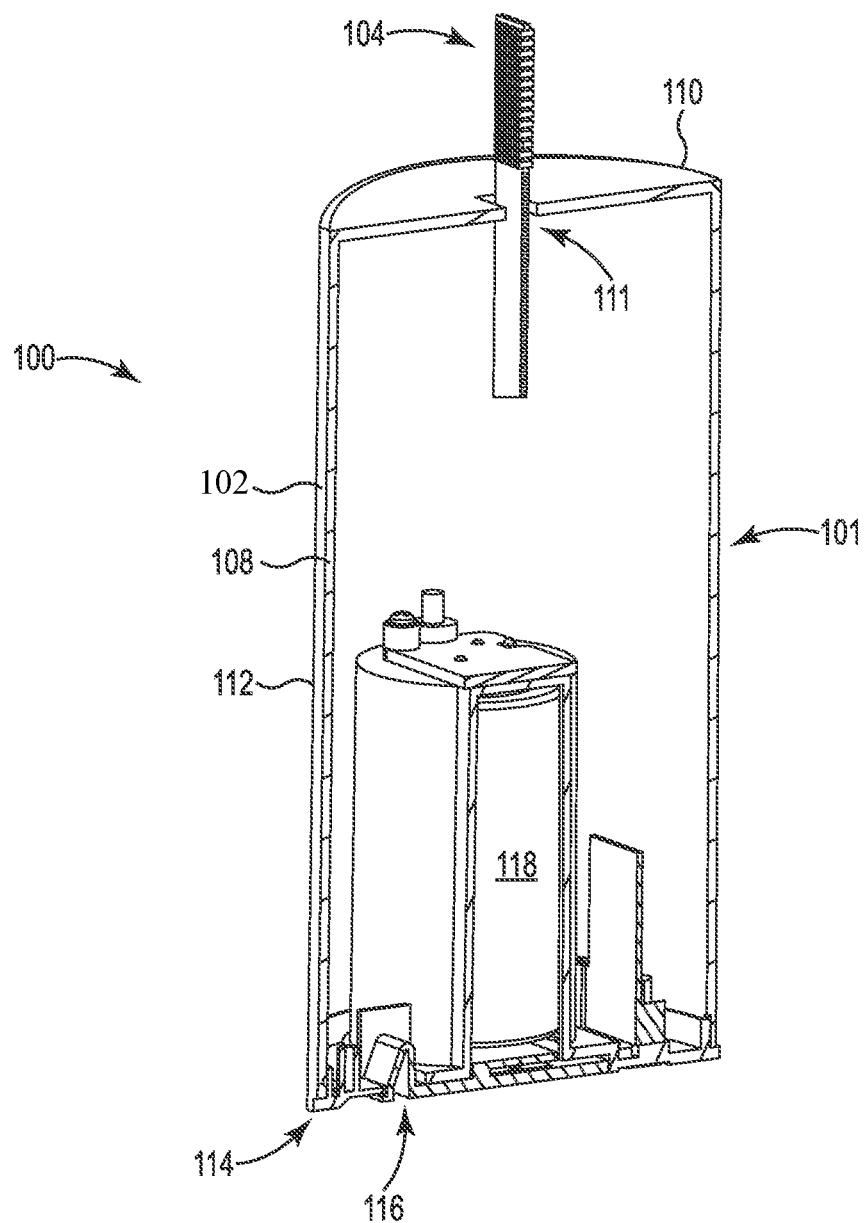
FIG. 1 is a cross-section of a flameless pillar candle, according to an embodiment of the present disclosure.
Figure 3:
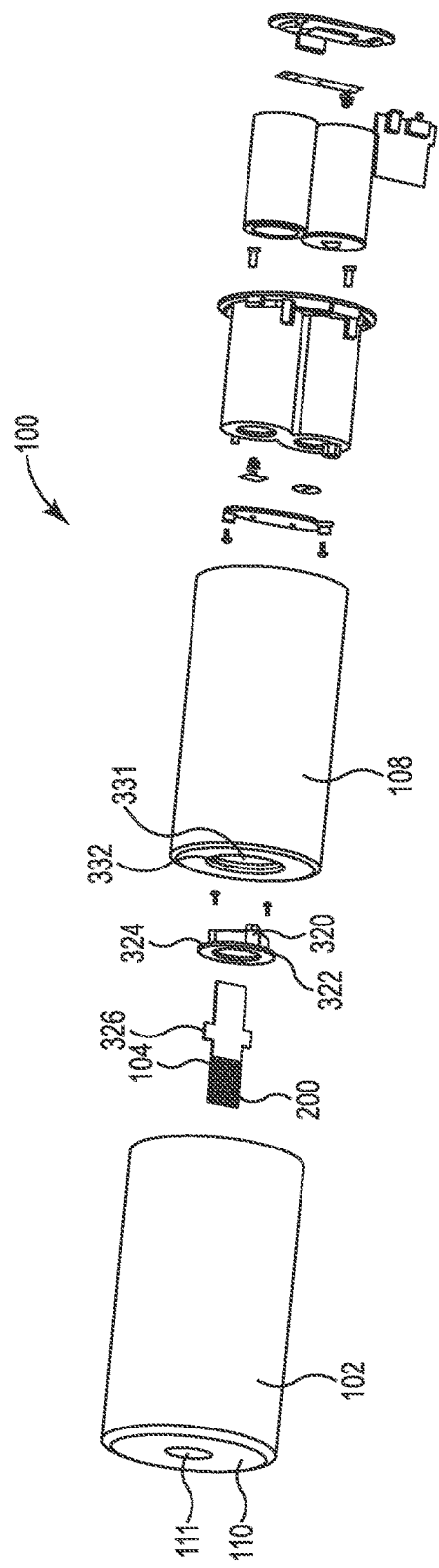
FIG. 3 is an exploded perspective view of a flameless pillar candle, according to an embodiment of the present disclosure.

The flameless candles described herein may provide a realistic flame-like light from a light source. In this regard, a flameless candle of the present disclosure may be comprised of one or more components that may function to mimic a natural flame and, additionally or alternatively, a flame like flicker of light. Referring to FIG. 1, a flameless candle 100 may be comprised of a motor base or body 102, a luminous panel 104, and a control panel. In various embodiments, the flameless candle 100 may also include a mounting base 108. In some embodiments, the mounting base 108 may be similar in design to the body 102, such that the mounting base 108 may fit into the body 102, seen in more detail in the exploded view of FIG. 3. In other embodiments, the candle body 102 and mounting base 108 may be the same or similar structures. In various embodiments, the mounting base 108 may be used to mount a lifting mechanism, which may raise or lower the luminous panel 104 into and/or out of the body 102.

Structure

The Body

Generally, as illustrated in the flameless pillar candle of FIG. 1, the body 102 may be comprised of a top surface 110, a bottom surface 114 upon which the candle rests, and a sidewall 112 between the top surface 110 and bottom surface 114. The body 102 may have desirable translucent, luminescent, and aesthetic properties to mimic the look and feel of a traditional candle. The body 102 may be made from one or more materials, including but not limited to, wax, paraffin, glass, polymeric materials, or any combination thereof. In some embodiments, the body 102 may be configured to have a cylindrical shape, thereby resembling a traditional pillar candle, as shown. However, other shapes or configurations are possible and within the scope of the disclosure including, but not limited to, a cube, cuboid, cone, pyramid, sphere, any other traditional shape, or any custom shape.

The top surface 112 may generally refer to the top portion of the candle. The top surface 112 may include one or more structural components. In various embodiments, the top surface 112 may include a through-hole or slot 111 through which the luminous panel 104 may extend, thereby protruding from an exterior surface of the body 102. In some embodiments, the top surface may be a substantially flat surface. In other embodiments, the top surface may have an indented central portion that may resemble the top surface of a used or partially melted traditional candle, where the wax may have been reduced by melting from the heat of the open flame in order to continue feeding the flame. The bottom surface 114 may generally be flat, resulting in a stable condition of the candle when placed on a table, shelf or other suitable flat surface. The bottom surface 114 may also include a cover 116, which may allow easy access to a power supply 118. In addition, the bottom surface 114 may include one or more control switches, which may activate and/or deactivate one or more functions presented herein.

The Luminous Panel

As illustrated in FIG. 1, one or more luminous panels 104 may be disposed in the center of the top surface 110 of the candle 100. The luminous panel 104 may have one or more components that are adapted to simulate a candle wick and/or flame. In one embodiment, seen in FIG. 2, the luminous panel 104 may be comprised of one or more illuminators, e.g., 202, 204, and a control panel 210. In other embodiments, the control panel 210, or control circuit, may or may not be formed on the luminous panel 104, but may nonetheless remain in electrical communication with one or more illuminators. The illuminators 202, 204 may be located on the top of the luminous panel 104, such that they may be exposed external to the body 102 of the candle 100.

Figure 2:
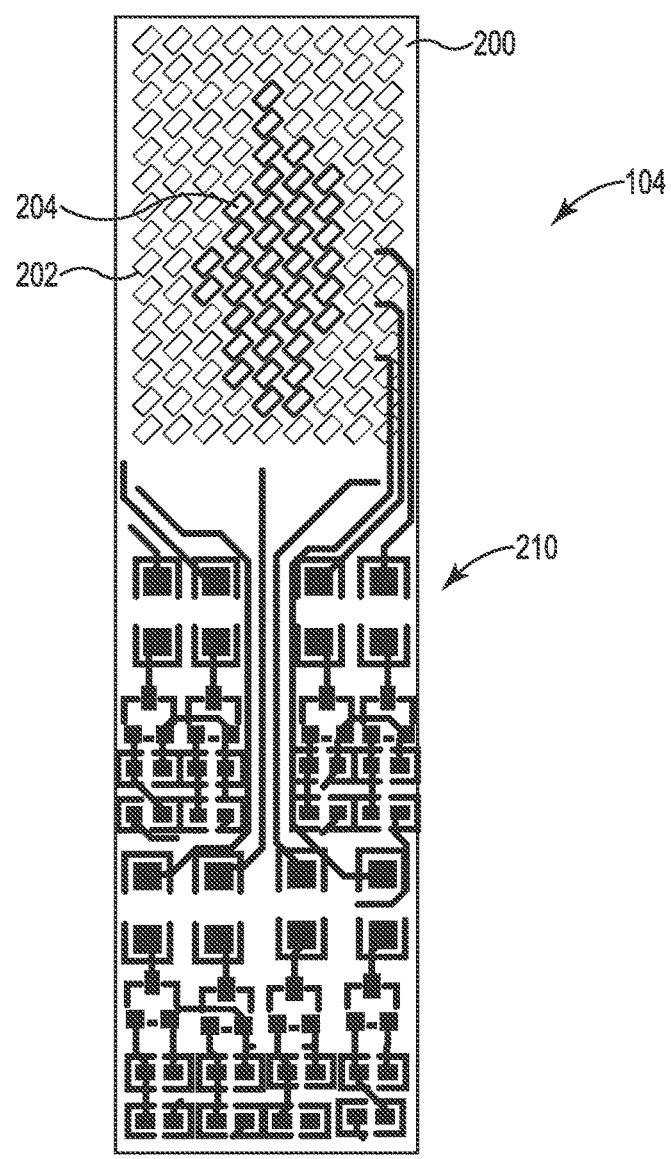
FIG. 2 is a perspective view of a luminous panel, according to an embodiment of the present disclosure.

The illuminators may be arranged on a display panel 200. In various embodiments, as seen in FIG. 2, the illuminators 202, 204 may be formed in rows and/or columns to generally form a matrix. In various embodiments, the illuminators 202, 204 may be positioned or aligned such that they are tilted or angled, in perspective to the candle. In another embodiment, the illuminators 202, 204 may be arranged perpendicular to the candle. In still another embodiment, the illuminators 202, 204 may be arranged parallel or straight up and down, in perspective to the candle. In at least one embodiment, there may be no defined order to the placement of one or more illuminators, i.e., a random arrangement. It may be appreciated that any suitable arrangement, or combination thereof, may be used to orient one or more illuminators on the display panel 200.

In one embodiment, the luminous panel 104 may be comprised of one display panel 200. In another embodiment, the luminous panel 104 may have two display panels 200, such that both sides of the luminous panel 104 may have a display panel 200. In still other embodiments, the luminous panel 104 and one or more display panel(s) 200 may cooperate to form other shapes. For example, three display panels 200 may be used to form a triangle, such that a display panel may be viewable from even more angles. In still another example, four display panels 200 may be used to form a square or cube. In yet another example, a luminous panel 104 and/or display panel 200 may be curved or circular in shape, such that the display panel 200 may be generally visible in a 360 degree perspective. In at least one embodiment, the illuminators may be comprised of one or more LEDs. In other embodiments, any suitable light or bulb may be additionally or alternatively used. In one embodiment, the illuminators 202, 204 may be rectangular bulbs or lights. In another embodiment, the illuminators 202, 204 may be square. In still another embodiment, the illuminators 202, 204 may be circular. It may be appreciated that any suitable shape for the illuminators 202, 204 may be used. In addition, the illuminators may be different colors. In some embodiments, each illuminator may be capable of illuminating in one or more colors, including but not limited to, white, orange, red, yellow, blue, purple, green, any other suitable color, or any combination thereof.

Furthermore, the one or more display panels 200 may also be comprised of any size, shape, or color. In one embodiment, as illustrated, the display panel 200 of luminous panel 104 may be generally rectangular in shape. In other embodiments, the display panel 200 may be circular, square or cube, or any other suitable shape. In still others, the display panel 200 may be generally shaped like a flame. In some embodiments, the display panel 200 may be black in color, especially when the illuminators 202, 204 are turned OFF, so as to simulate a natural wick. In other embodiments, the display panel 200 may be any suitable color and is therefore contemplated by the present disclosure.

The Control Panel

The control panel 210 (also referred to interchangeably herein as control circuit) may independently control one or more of the illuminators to form a glowing flame effect on the one or more display panels 200. The control panel 210 may be in electrical communication with one or more of the illuminators 202, 204. In various embodiments, the control panel 210 may be configured to independently turn ON/OFF one or more of the illuminators. In addition, the control panel 210 may be configured to independently control the electrical current provided to each of the one or more illuminators and thereby control the brightness and/or dimness of the illuminator(s).

In various embodiments, in addition or alternatively to the control panel 210, one or more other control circuits or control panels may control one or more of the illuminators 202, 204 in order to form a dynamic flame effect on the display panel 200. In one embodiment, the control panel may be configured to independently trigger one or more illuminators 202, 204 to perform one or more functions including, but not limited to, turning ON, turning OFF, brightening or fading in, dimming or fading out, any other function, or any combination thereof. The control panel may be electrically connected to the power source 118. In another embodiment, the control panel may be mechanically connected to the luminous panel 104. It may be appreciated that any suitable location for any control circuit and/or control panel 210 may be used.

The Mounting Base

In various embodiments, the luminous panel 104 may be mechanically connected or mounted to the candle body 102 and/or mounting base 108, such that it may be generally non-moveable. In various embodiments shown in exploded FIG. 3, the mounting base 108 may include a grove 332 and through-hole 331. In one embodiment, the groove 332 and/or through-hole 331 may be circular. In another embodiment, the groove 332 and/or through-hole 331 may be square shaped. It may be understood that any suitable shape for the groove 332 and through-hole 331 may be used. The groove 332 and through-hole 331 of mounting base 108 may match the through-hole 111 of body 102, such that a sleeve or slot may be provided for luminous panel 104. The groove 332 and through-hole 331 may comprise one or more limit levels, or indented levels. A mounting pad 320 may generally connect or mesh with and/or rest on the limit levels of the mounting base 108, such that it may not fall below the top surface of the mounting base 108. That is, the mounting pad 320 may have a shoulder 322 that is positioned over a limit level of the mounting base 108, thereby becoming generally embedded in the grove 332 and through-hole 331. In various embodiments, the mounting pad 320 may also include one or more locating slots 324. The luminous panel 104 may have one or more protruding arms, or stoppers 326. The one or more stoppers 326 of the luminous panel 104 may generally and substantially align with the one or more locating slots 324 of the mounting pad 320. Once the stoppers 326 are aligned in the locating slots 324 the luminous panel 104 may be stopped, or generally prevented from lowering further into the body of the candle, which may allow the display panel 200 to be generally viewable on the exterior surface of the candle body 102.

It may be appreciated that any suitable method may be used to hold the luminous panel 104 in place, such that the display panel 200 may be generally viewable on the exterior surface of the candle body. For example, in one embodiment, the luminous panel 104 may have no stoppers 326. The mounting pad 320 may, generally, have a centrally located slot 324. The base, or side opposite the display panel 200, may be inserted into the central locating slot, thereby preventing the luminous panel 104 from lowering further into the body of the candle. The luminous panel 104 may, additionally or alternatively, be directly or indirectly affixed by an adhesive, a screw, a friction fit, a bayonet fit, or any other suitable method to the mounting pad 320, to the mounting base 108, and/or to the body 102.

In some embodiments, the luminous panel 104 may not be fixed in place; that is it may be adjustable. In such embodiments, there may be a lifting mechanism to raise and/or lower the luminous panel 104 into and out of the body 102 of candle 100.

The Lifting Mechanism

Figure 4:
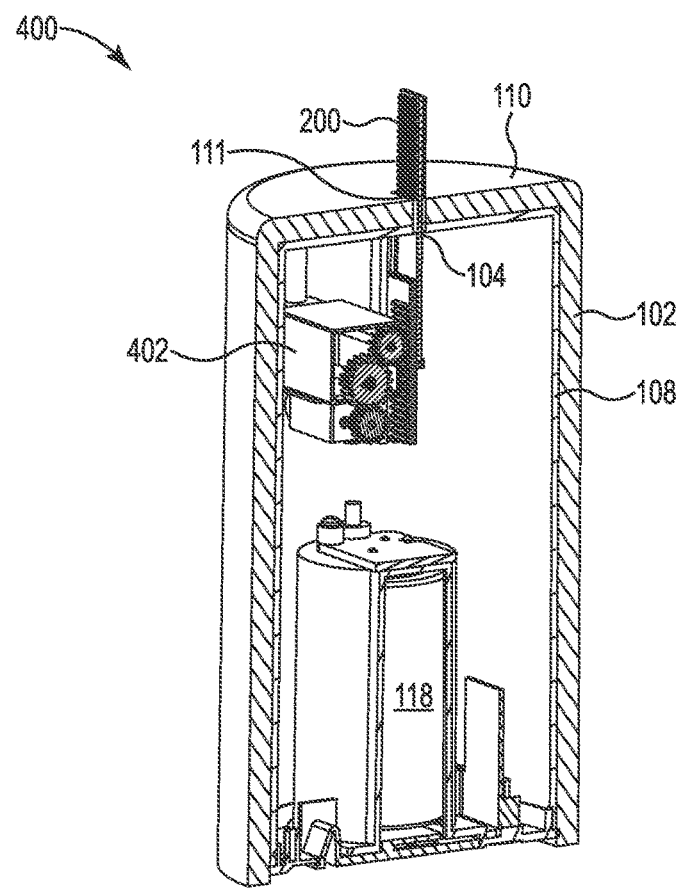
FIG. 4 is a cross-section of a flameless pillar candle, according to another embodiment of the present disclosure.

Referencing FIG. 4, a lifting mechanism 402 may be used to expose the display panel 200 while activated, or ON, but to withdraw the display panel 200 mostly or substantially within the body 102 while not in use, or OFF. That is, the lifting mechanism 402 may lower the luminous panel 104 into the body 102 of candle 400, such that the display panel 200, or some portion thereof, may be substantially secured or encased inside the candle 400. Similarly, the lifting mechanism 402 may raise the luminous panel 104 out of the body 102 of candle 400, such that the display panel 200, or some portion thereof, may be substantially exposed outside the candle 400. The lifting mechanism 402 may be installed in the mounting base 108, however, any suitable location for the lifting mechanism 402 may be used. The lifting mechanism 402 may be mechanically connected to the luminous panel 104 via a direct or indirect connection, or any combination thereof.

Figure 5:
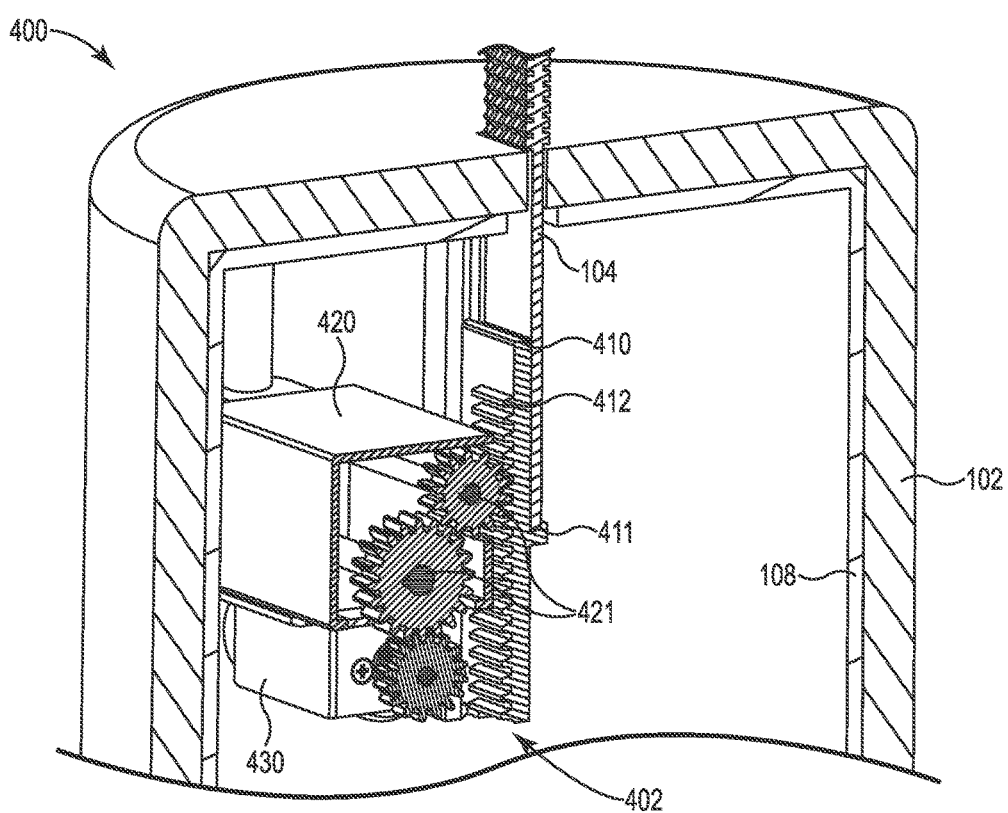
FIG. 5 is a close-up cross-section of a portion of a flameless pillar candle, according to an embodiment of the present disclosure.

In at least one embodiment, the lifting mechanism 402 may use a rack and pinion system to raise and/or lower the luminous panel 104. As seen in FIG. 5, the lifting mechanism 402 may be comprised of one or more components for raising or lowering the luminous panel 104 including, but not limited to, a lifting plate 410, gear box 420, and driver 430.

The lifting plate 410 may be mechanically connected to the luminous panel 104, wherein raising the lifting plate 410 may raise the luminous panel 104, and conversely, lowering the lifting plate 410 may lower the luminous panel 104. The mounting base 108 may contain a slide, which may be configured to fit the lifting plate 410 into it. In some embodiments, the back side of the lifting plate 410 may sit in the slide. In some embodiments, another side of the lifting plate 410 may contain a locating slot 424, which may support the luminous panel 104. That is, the bottom of the luminous panel 104 may connect with the locating slot 424 by any suitable method including, but not limiting to, sliding into it, resting on it, locking into it, any other suitable method, or any combination thereof. In some embodiments, another side of the lifting plate 410 may contain a lifting gear 412. In various embodiments, the lifting gear 412 may be comprised of one or more grooved slots and teeth, often referred to as a rack.

In some embodiments, a gear box 420 may facilitate the movement of the luminous panel 104 into and out of the candle body 102. The gear box 420 may contain one or more transmission gears 421. Each transmission gear 421 may be comprised of one or more grooved gear slots and corresponding gear teeth. Each of the one or more transmission gears 421 may be configured such that the grooved slots and gear teeth from one transmission gear 421 may link or connect with the grooved slots and gear teeth from another transmission gear 421, thereby performing a meshing transmission. In this way, by turning one transmission gear 421 each other transmission gear 421 may also turn. One of the one or more transmission gears 421 may link or connect to perform a meshing transmission with the grooved teeth of the lifting gear 412, such that turning the transmission gear 421 in one direction may cause the lifting gear 412 to lower and by turning the transmission gear 421 the other direction may cause the lifting gear 412 to rise. That is, turning a transmission gear 421 in a counter or clockwise direction may raise or lower the lifting gear 412 in a linear direction. It should be appreciated that any number of transmission gears 421 may be used, including but not limited to, one transmission gear. In still other embodiment, the gear box may be eliminated and the lifting plate may interact directly with the driver 430.

In some embodiments, a driver 430 may be installed. The driver 430 may be configured to turn one of the one or more gears, causing a transfer of motion to the lifting plate. In one embodiment, the driver 430 may be an electric motor, which may mechanically connect to the transmission gear in order to facilitate its rotation. However, any suitable method to turn the one or more transmission gears may be used. In various embodiments, the driver 430 may be electrically connected to the control panel. In this manner, activating or deactivating one or more control switches may cause the driver 430 to turn one or more gears to affect either the raising or lowering of the luminous panel 104 through the through hole 111, as desired.

In one embodiment, the raising or lowering of the luminous panel 104 may be configured to activate the display panel 200, such that the display panel 200 may be activated after rising above the top surface 110 of the candle. In other embodiments, the display panel 200 may be configured to activate at any time and in any position.

In another embodiment, using for example a spring-loaded lifting mechanism, any portion, or all, of the luminous panel 104 may be pushed down into the body 102 of the candle 100, 400 by a user, such that at least a portion of the luminous panel 104 locks into place within the body and is no longer exposed. The user may then return the luminous panel 104 to a generally exposed position by, for example and example only, depressing the remaining exposed portion of the luminous panel thereby unlocking it, which may raise the luminous panel 104 out of the body 102. In some embodiments, the depressing of luminous panel 104 into the body 102 of the candle 100 may also be configured to act as a control switch, such as that disclosed in U.S. application Ser. No. 14/297,862, filed Jun. 6, 2014, entitled "Electric Flameless Candle," herein incorporated by reference in its entirety. In some embodiments, one or more other control switches may additionally or alternatively be used.

Power

As discussed above, a control switch may be located on the bottom surface 114 of the candle 100, 400. The one or more control switches may be configured to perform one or more functions including, but not limited to, raising up the luminous panel, lowering the luminous panel, activating or deactivating an illuminator on the display panel, causing an illuminator to flicker, dimming or brightening an illuminator, any other function, and any combination thereof.

Referencing back to FIGS. 1 and 4, a power source 118 may be located within the body 102 and/or mounting base 108. In various embodiments, the power source may be accessed via a cover 116. In other embodiments, the power source may be located in any location, including but not limited to, externally. The power source may include, but is not limited to, a disposable battery, a rechargeable battery, a power cord and attachment, any other known or suitable power source, or any combination thereof. In at least one embodiment, 1.5V batteries may be used. In various embodiments, based on demand, one to four 1.5V batteries may be used. In other embodiments, more than four 1.5V batteries may be used. It should be appreciated that any type or size of battery may be used to provide power.

The Flameless Light Bulb

Figure 6:
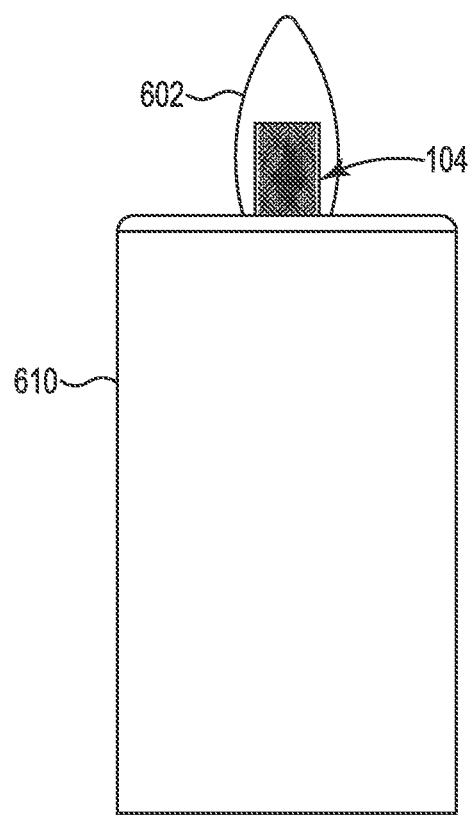
FIG. 6 is a perspective view of a flameless light bulb, according to an embodiment of the present disclosure.

In reference to FIG. 6, a flame shell or casing 602 may encapsulate the luminous panel 104 of candle 600. In various embodiments, the casing 602 may be shaped in appearance like a flame. In other embodiments, the casing 602 may be generally shaped to match the luminous panel 104. In still other embodiments, the casing 602 may be shaped in appearance like a traditional light bulb. That is, the casing 602 may be generally spherical, elongated, or any other suitable shape, or any combination thereof. In various embodiments, the casing 602 may be transparent or semi-transparent, as desired. The casing 602 may be comprised of one or more materials, including but not limited to, glass, plastic, metal, any other suitable material, or any combination thereof. The casing 602 may protect or cover the illuminators or LEDs on the luminous panel 104. In some embodiments, the casing 602 may give the lighting device a more vivid glowing effect when in use. In various embodiments, the casing 602, may or may not be removable. The casing 602 and luminous panel 104 may be attached to a mounting base 610. In at least one embodiment, the mounting base may be substantially similar to, and incorporating one or more components of, the candles 100, 400, described herein. In at least one embodiment, the casing 602 and luminous panel 104 may, collectively, be lowered into the body of the candle 600 by one of the methods discussed above.

Figure 7:
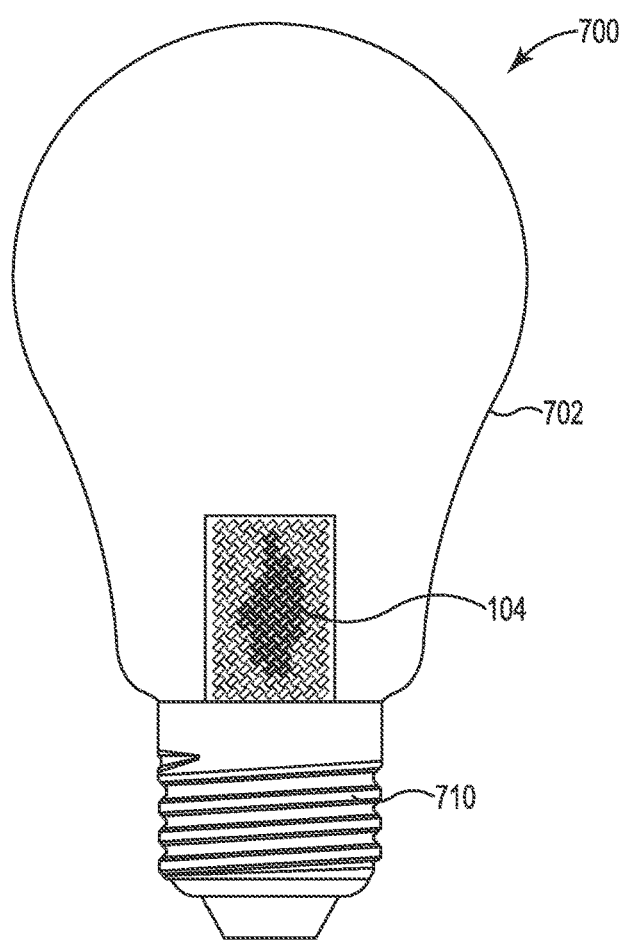
FIG. 7 is a perspective view of a flameless light bulb, according to another embodiment of the present disclosure.
Figure 8:
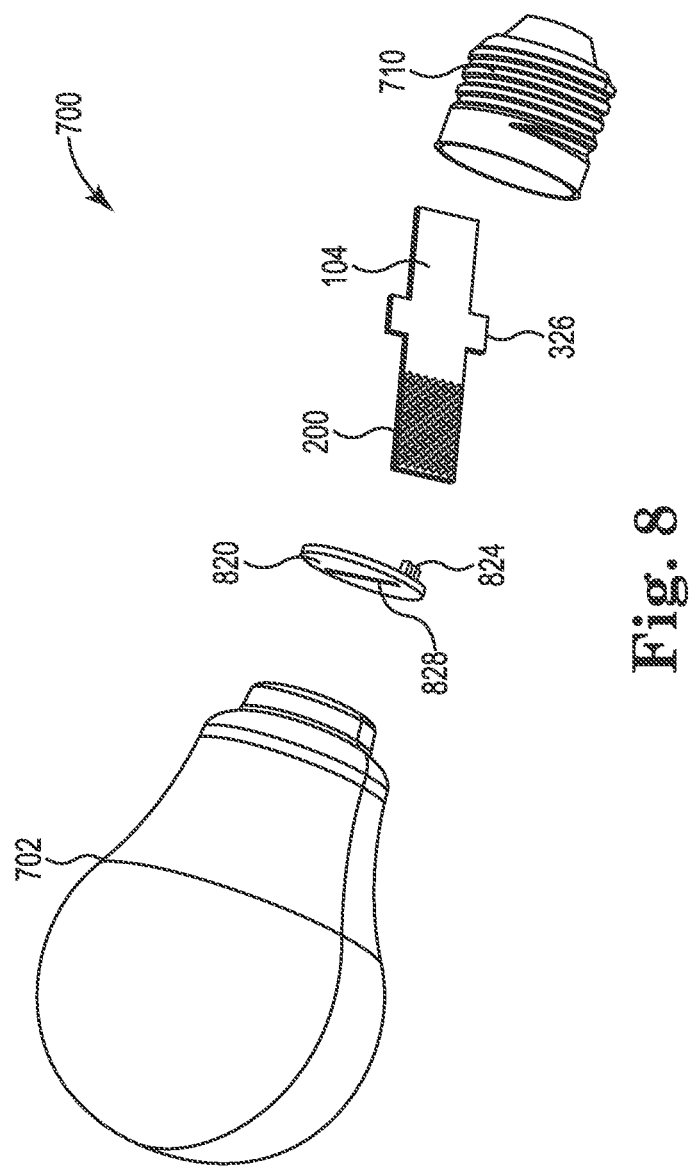
FIG. 8 is an exploded perspective view of a flameless light bulb, according to an embodiment of the present disclosure.

In another embodiment, referencing FIGS. 7-8, a casing 702 resembling a standard light bulb may encase a luminous panel 104, or some portion thereof. In various embodiments, a flameless light bulb may have a mounting base 710 to which the casing 702 and/or luminous panel 104 may mechanically connect. In various embodiments, the mounting base 710 may have external threads. The external threads may be used to screw into a traditional light socket, such as but not limited to an E27, E14, MR16, or any other suitable light bulb socket, thereby providing power to the luminous panel 104. In various embodiments, the illuminators on the display panel may automatically activate once power is supplied to the luminous panel, control circuit, and/or control panel. In some embodiments, one or more functions may be activated based on the varying power provided. For example and example only, on a lamp that provides for more than one dimming or brightness capability the luminous panel may change its functionality from dynamic flame, to static flame, to pulse, and then to off as the different stages are activated.

As seen in exploded FIG. 8, a mounting pad 820 (herein referred to interchangeably as a disc retainer 820) may, generally, be the same shape, i.e., circular, as the mounting base. As discussed above, a mounting pad 820 may have one or more limit slots 824 and through-holes 828. The through-hole 828 may generally match the cross section of the luminous pane 104. The limit slots 824 may generally match the size and shape of the stoppers 326 on the luminous panel 104, such that they prevent the luminous panel 104 from moving either up through the disc retainer 820, down through the disc retainer 820, or both, as is desired or necessary. The casing 702 may connect to the disc retainer 820. In one embodiment, the casing 702 may connect, and in some cases substantially permanently connect, to the mounting base 710 by a bolt, screw, or other suitable securing mechanism. In another embodiment, the casing 702 may have external threads that screw into internal threads within the mounting base 710, thereby securing attachment. It may be understood that any suitable method of attaching the casing 702 to the mounting base 710 may be used.

Figure 9:
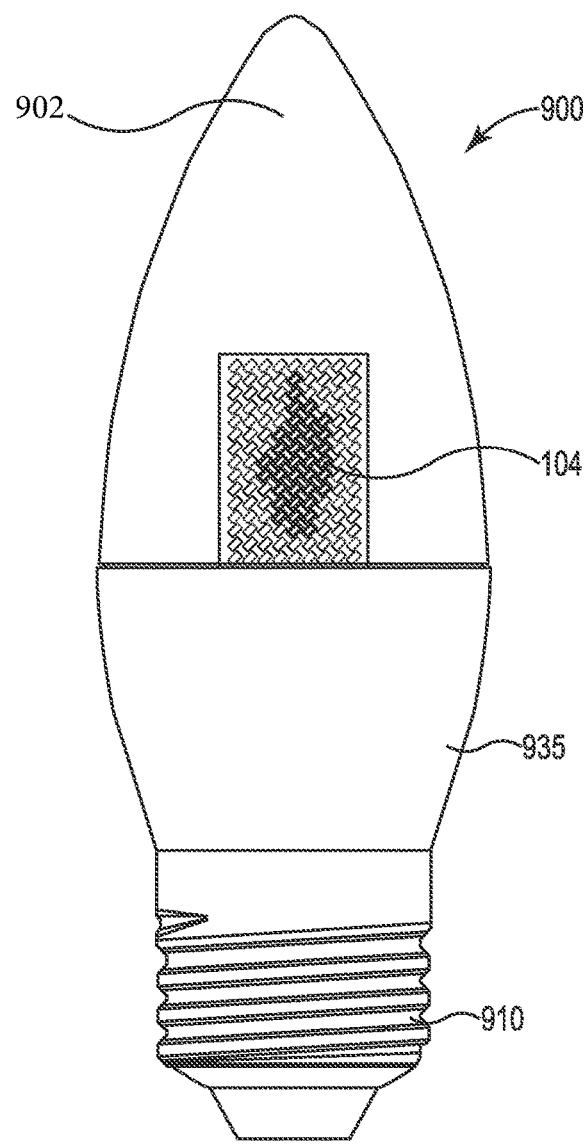
FIG. 9 is a perspective view of a flameless light bulb, according to another embodiment of the present disclosure.
Figure 10:
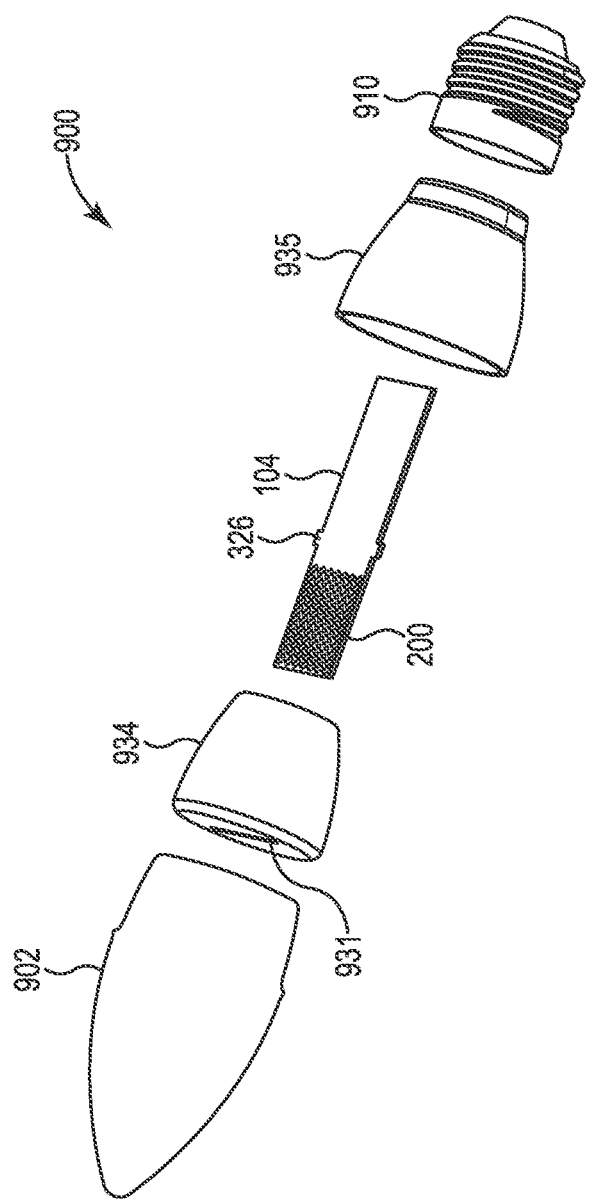
FIG. 10 is an exploded perspective view of a flameless light bulb, according to an embodiment of the present disclosure.

Referencing FIG. 9 and exploded FIG. 10, a casing 902 resembling a light bulb may encase the luminous panel 104, or some portion thereof, but may also include an accommodating base 935. The accommodating base 935 may, in various embodiments, be generally opaque, generally transparent, or any degree of transparency between opaque and transparent. The accommodating base 935 may, additionally or alternatively, be translucent, thus giving off light. In various embodiments, the casing 902 may attach to the accommodating base 935. The accommodating base 935 may have an accommodating chamber, which may house some portion of the luminous panel 104. The accommodating base 935 may be further comprised of a fastening piece 934, which may have the same properties as the accommodating base, and may generally fit within the chamber. The fastening piece 934 may have a slot or through hole 931 that may, generally, match the cross section of luminous panel 104, such that luminous panel 104 may slide through slot 931. The slot 931 may be configured such that it has a width greater than the average cross section of luminous panel 104 but smaller than the width of luminous panel 104 at the cross section that includes stoppers 326. Fastening piece 934 may mechanically connect, in any suitable method, with accommodating base 935 thereby securing the luminous panel between fastening piece 934 and accommodating base 935. Accommodating base 935 may connect with the mounting base 910. In one embodiment, accommodating base 935 may have external threads that match generally with internal threads in mounting base 910 such that they may screw together. In another embodiment, the accommodating base 935 may be secured to, and in some cases secured substantially permanently to, mounting base 910 with a bolt, screw, and/or other securing mechanism(s). As discussed above, the mounting base 910 may be screwed into a light socket for existing domestic light bulbs, such as but not limited to E27, E14, MR16, or any other suitable light socket.

The control panel, or control circuit, may be located on the luminous panel 104, within the mounting base 710, 910 or any other suitable location. The flameless light bulbs 700, 900 may or may not have one or more external control switches that may activate or deactivate one or more functions of luminous panel 104.

As may be appreciated, embodiments of the invention may be used in a variety of lighting devices contemplated by the present disclosure and include, but are not limited to, lanterns, wishing lamps, torches, fireplaces, outdoor lamps, wall lamps, flashlights, desk lamps, floor lamps, etc.

Functionality

Referencing back to FIG. 2, a luminous panel 104 may have a display panel 200 and a control panel 210. The control panel 210 may control the illuminators 202, 204 on the display panel 200. As discussed above, the control panel 210 may be located on the illuminator panel 104, at some other electrically connected location, or any combination thereof.

The illuminators 202, 204 may, in some embodiments, be arranged in one or more rows and/or columns. The control panel 210 may control independently the illuminators by turning them ON, turning them OFF, dimming and fading out, brightening and fading in, or any combination thereof. In various embodiments, the control panel 210 may use one or more MCUs, or multi-controller units and one or more signals comprised of random frequencies and amplitudes of current to independently control the illuminators. The circuit panel 210 may also control pulse-width modulation and the frequency and duty ration of the signal(s) received by the illuminators. In at least one embodiment, a matrix method may be used to transmit a signal to the one or more illuminators. In at least one embodiment, the signal(s) may be a digital signal. In some embodiments, the signal(s) may be random or randomized. The signal(s) transmitted randomly to one or more of the LED lights on the luminous panel may cause the LEDs to produce what appears visually to be a natural flame which has a natural "flicker" of light to the human eye.

However, it may be understood that any suitable method to illuminate the display panel, or some portion thereof, may be used. For example, only one illuminator may illuminate. In another example, the each illuminator on the display panel may illuminate. In still another example, only one row and/or one column may illuminate. Other configurations of illuminated lights and/or shapes are considered and within the scope of the present disclosure.

For example, row nine column four, or illuminator 204, may be selected to turn ON or OFF using one or more MCUs, or multi-controller units. One or more MCUs may control one or more illuminators. In the example shown in FIG. 2, a plurality of illuminators may be turned ON, denoted by the dark shading, including illuminator 204. Several other illuminators, including illuminator 202 may be turned OFF, and are thus are not shaded. In at least one embodiment, the pattern of the illuminators turned ON and turned OFF may form a pattern simulating the effect of a real flame. In another embodiment, other images or light configurations may be formed. Any one or more illuminators may be turned ON, turned OFF, change between one or more colors, brightened, dimmed, or may generally flicker in order to simulate a true flame's natural movement, brightness, colors, and flicker.

Figure 11A:
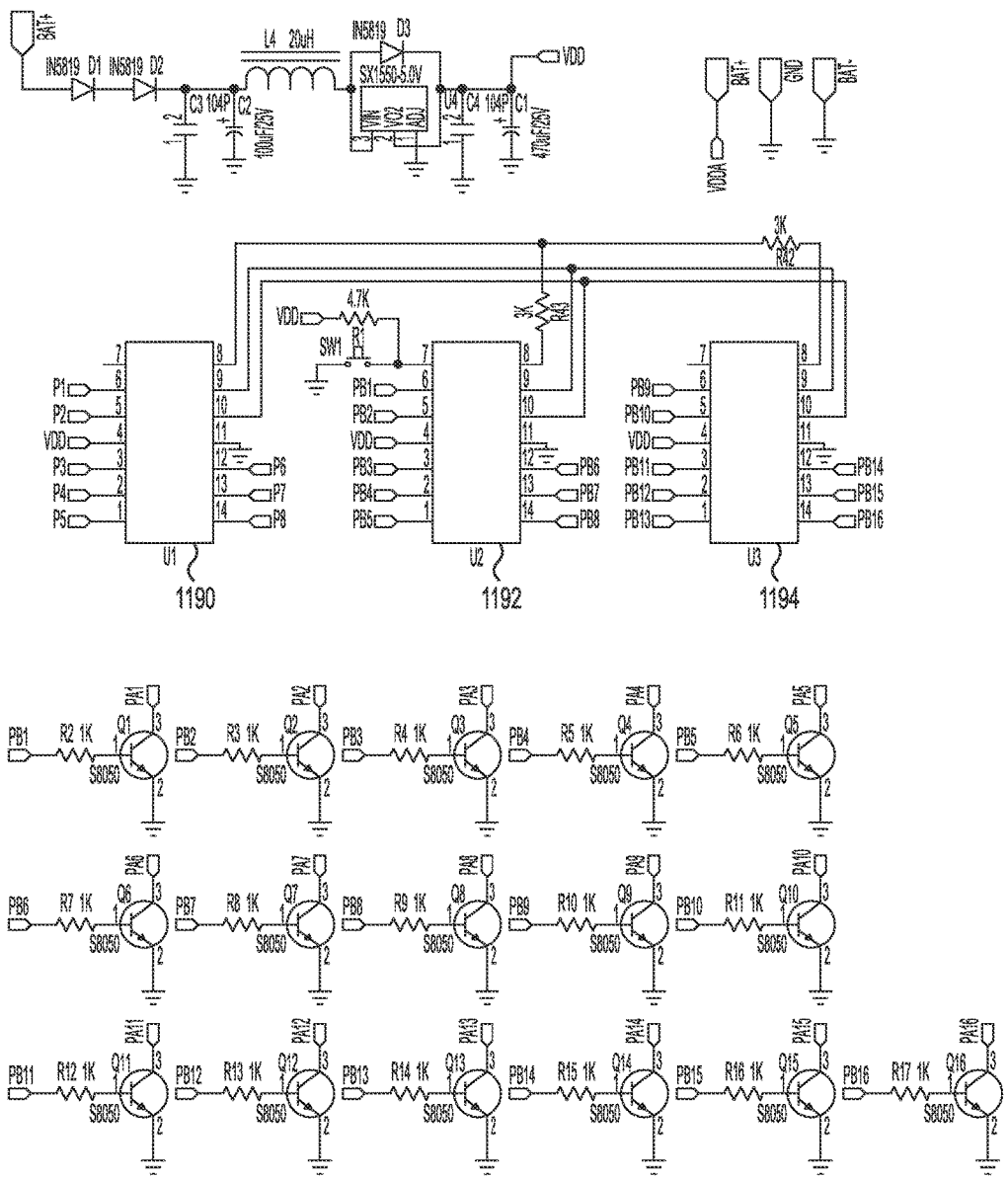
FIGS. 11A and 11B include schematics of some components of a control panel, according to an embodiment of the present disclosure.
Figure 11B:
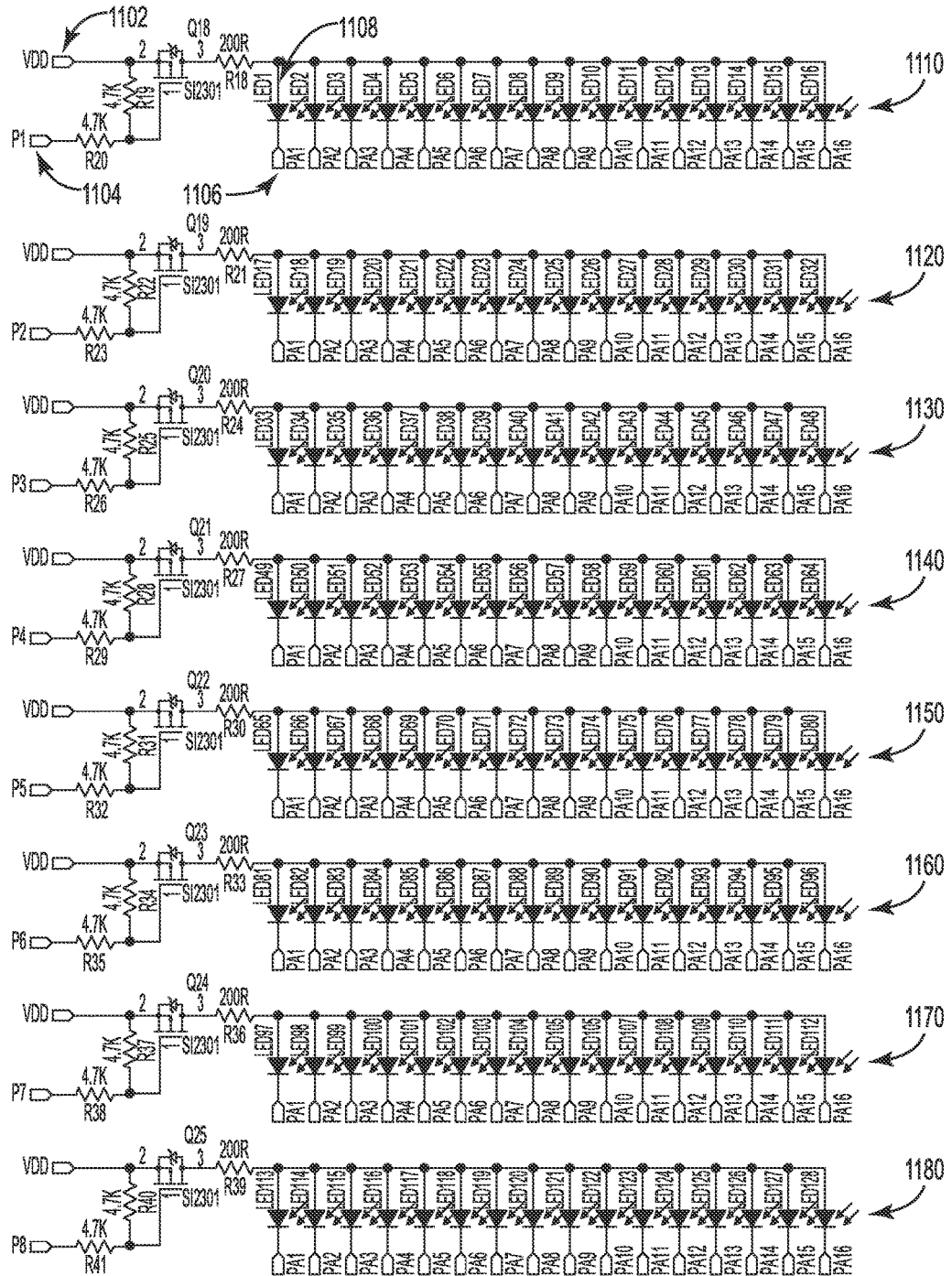

Referencing FIGS. 11A and 11B, an example of some control panel components are illustrated in schematic. Different series 1110, 1120, 1130, 1140, 1150, 1160, 1170, 1180 (herein referenced collectively by series 1110) of illuminators, e.g., 1108 may be connected to a power source. In some embodiments, each series 1110 of connected illuminators 1108 may represent a row of illuminators 1108 on the display panel. In other embodiments, each series 1110 of connected illuminators 1108 may represent a column of illuminators 1108 on the display panel. It is understood that each series may represent any combination of lights on the display panel, as desired. In some embodiments, as shown, each series 1110 may connect to sixteen different illuminators. In other embodiments, each series may connect to greater than or less than sixteen different illuminators.

Each series 1110 may have a power source, represented at least by signal or input 1102, which may provide power to the entire series of illuminators. One signal, represented at least by signal or input 1104, from an MCU 1190, 1192, 1194 may generally or temporarily limit the power provided to the series of illuminators. That is, input 1104 may provide a signal causing substantially no power to get to the illuminators, causing substantially maximum power to get to the illuminators, or causing any amount of power between substantially none to substantially maximum to get to the series of illuminators. As may be appreciated from the schematic, therefore, input 1102 may control the power to an entire series of illuminators. Accordingly, to control individual illuminators in the series, another signal (represented, for example, by input 1106) from an MCU 1190, 1192, 1194, corresponding to one or more, or in some cases one for each, may also control the power provided to one or more illuminators. For example, input 1106 may limit the power to illuminator 1108 to substantially none. That is, if input 1104 was not limiting the power to the series, but input 1106 did limit the power to illuminator 1108, each illuminator in the series, except for illuminator 1108, may be turned ON. In a sense, input 1106, and the like, essentially acts like a switch to complete or break the circuit for any given illuminator in a series.

In varies embodiments, the signal or input 1106 may control only the power provided to one illuminator. In another embodiment, signal or input 1106 may control the power to one or more illuminators, such as a different row or column. The signal or inputs 1104, 1106 may provide or limit power based on one of the one or more signals generated using the one or more MCUs 1190, 1192, 1194, one or more algorithms, and or any other suitable method. The one or more of the MCUs 1190, 1192, 1194, illustrated for example purposes only, may control the input values. In one embodiment, the MCUs 1190, 1192, 1194 may control the positive power supply and/or negative power supply of the illuminators. In one embodiment, using a scanning method, the MCUs may then send synchronized signals to notify other MCUs of varying power supply. One or more signals may be transmitted to one or more illuminators, so as to create the effect of a flame, or any other image, that may change in shape, size, color, movement, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:
1. An electric flameless candle, comprising:
   a body configured in shape and size to simulate a true flame candle;
   a light source operably connected to the body and positioned to be generally protruding from an exterior surface of the body, the light source comprising a plurality of illuminators electrically operated to illuminate in a way that simulates the movement of a real candle's flame and
   a lifting mechanism configured to cause the light source to protrude from the exterior surface of the body upon receiving an activation signal and to withdraw at least a section of the light source to within the body upon receiving a deactivation signal.
2. The electric flameless candle of claim 1, wherein the light source receives a digital signal varying in at least one of amplitude, frequency, and duty cycle.
3. The electric flameless candle of claim 2, wherein the digital signal forms part of a pulse-width modulation signal.
4. The electric flameless candle of claim 1, wherein the light source comprises a LED light.
5. The electric flameless candle of claim 4, wherein the light source comprises a panel comprising a plurality of LED lights.
6. The electric flameless candle of claim 5, wherein each LED receives an individual digital signal.
7. The electric flameless candle of claim 5, further comprising a push button control switch comprising the panel.
8. The electric flameless candle of claim 5, wherein the plurality of LED lights are arranged in a matrix.
9. The electric flameless candle of claim 1, wherein the lifting mechanism is a spring-loaded system.
10. The electric flameless candle of claim 1, wherein the lifting mechanism is a rack and pinion system.
11. The electric flameless candle of claim 1, wherein each LED receives an individually randomized digital signal.
12. The electric flameless candle of claim 1, further comprising a casing configured to substantially cover the light source, the casing having a degree of translucence.
13. The electric flameless candle of claim 1, wherein the plurality of illuminators collectively illuminate to simulate a true flame.
14. The electric flameless candle of claim 1, wherein the plurality of illuminators emit different colors of light.
15. The electric flameless light bulb of claim 1, wherein the plurality of illuminators are configured to illuminate to form a plurality of shapes.
16. The electric flameless light bulb of claim 15, wherein the plurality of shapes includes simulating a true flame.
17. The electric flameless candle of claim 1, wherein:
   the lifting mechanism includes a lifting member and a driver,
   the driver is coupled to the lifting member to cause the lifting member to move, and
   the lifting member is coupled to the light source to cause the light source to move vertically up or down in response to a movement of the lifting member.
18. The electric flameless candle of claim 17, further comprising a gear box coupled to the driver and to the lifting member, the driver is configured to cause the at least one gear of the gear box to move to cause a transfer of motion to the lifting member.

19. The electric flameless candle of claim 18, wherein the lifting member includes a lifting gear that is configured to engage with one or more gears of the gear box.

20. The electric flameless candle of claim 17, wherein:
the driver includes an electric motor that is mechanically coupled to the lifting member,
the electric motor is further coupled to a control switch, and
the electric motor is configured to receive the activation signal and the deactivation signal from the control switch.

21. The electric flameless candle of claim 1, wherein the lifting mechanism is configured to be activated upon receiving a downward pressure as the activation signal.

22. The electric flameless candle of claim 21, wherein:
the lifting mechanism is configured to partially withdraw the light source to within the body upon receiving the downward pressure, and
the lifting mechanism is configured to protrude an entire light emitting section of the light source upon receiving the deactivation signal in the form of another downward pressure after the light source has been partially withdraw to within the body.

23. The electric flameless candle of claim 22, further comprising a locking mechanism that is configured to lock the lifting mechanism in place upon partial withdrawal of the light source to within the body.

* * * * *